3,080,314
ODOR-FREE NAPHTHAS
George W. Ayers, Chicago, Ill., assignor to The Pure
Oil Company, Chicago, Ill., a corporation of Ohio
No Drawing. Filed Nov. 13, 1959, Ser. No. 852,598
9 Claims. (Cl. 208—289)

This invention relates to the preparation of industrial odorless naphthas. More particularly, this invention relates to the prevention of the formation of odor during the distillation of essentially odorless naphthas (including heavy alkylates and fractions thereof) by conducting the distillation in the presence of mercaptobenzothiazole. Odorless naphthas find application in many industrial services and processes because of their distinctive qualities and advantages, such as lack of odor and toxicity, good solvent properties, low cost, and availability. Naphthas may be defined as hydrocarbon mixtures, usually of comparatively narrow boiling range with end boiling points below 600° F., and derived from the fractional distillation of petroleum or of coal-tar oils, or from the fractional distillation of synthetic hydrocarbon products. Naphthas range broadly in their chemical and physical properties, but can be classified as straight-run petroleum naphthas, aromatic naphthas, synthetic naphthas, etc., including alkylates, heavy alkylates, or fractions thereof. The present invention can be applied to straight-run petroleum naphthas boiling above approximately 340° F., that have been rendered essentially odorless by removal of aromatic hydrocarbon components, for example by treatment with silica gel, but finds particular application in the treatment of synthetic naphthas, such as heavy alkylates or fractions thereof, and the preparation of odorless naphthas from heavy alkylates.

Although naphthas consist essentially of mixtures of hydrocarbons, certain of the hydrocarbons may show slight instability or may exhibit oxidation during fractional distillation. Moreover, various impurities such as organic oxygen compounds may be present in small amounts in such naphthas after their preparation by fractional distillation of synthetic materials such as heavy alkylates. The preparation of odorless naphthas, particularly naphthas of the higher boiling ranges and heavy alkylate fractions, which are free from odor and which also remain odor-free during storage or use over extended periods of time, has been heretofore an uncertain and tedious operation. One batch of odorless naphtha may be satisfactory from the odor standpoint, while another batch prepared in apparently a similar operation may be wholly unsuitable as an odorless material. There are many processes disclosed in the prior art which relate to removing odorous materials from hydrocarbon materials and naphthas. These are usually classified as sweetening processes wherein deleterious sulfur compounds are chemically modified, removed, or adsorbed. For purposes of the present invention, these prior art refining and sweetening methods, whether chemical or physical, when applied to essentially odorless heavy naphthas or alkylate fractions, are generally found to be inadequate for the removal of odor, or the prevention of odor during distillation (as when an essentially odor-free naphtha is distilled), or the prevention of odor formation during storage.

In accordance with the present invention, it has been found that the distillation of essentially odorless naphthas or heavy alkylates in the presence of small amounts of mercaptobenzothiazole prevents the formation of odor during distillation, and results in a product which is uniformly satisfactory and stable. The instant invention makes the preparation of odorless, stable naphthas a more uniform and dependable operation.

This invention does not relate to the removal of odor from naphthas or heavy alkylates which already have decomposed to the point of being odorous, but rather is directed to the prevention of odor formation during the distillation of those materials which are already essentially odor-free, but have a decided tendency to go off-odor during distillation or during storage. Consequently, those processes in the prior art which are concerned with chemical refining, adsorbing, and sweetening, as applied to cracked naphthas or naphthas containing sulfur compounds which are notoriously odorous, have no bearing on the present invention. It has further been found that although some essentially odorless naphthas can be distilled under reduced pressure, or in the presence of steam, without appreciable odor development, the results are erratic and such processing cannot be depended upon for the uniform production of odorless naphthas of marketable quality. By incorporating small amounts of mercaptobenzothiazole during distillation under reduced pressure, and/or in the presence of an inert gas such as nitrogen or steam, the resulting products are uniformly odorless.

In carrying out the invention, an amount of mercaptobenzothiazole sufficient to prevent or inhibit the formation of odorous compounds is used. For this purpose between about 0.1 and 100 lbs. of mercaptobenzothiazole per 1000 bbls. of naphtha may be used. In general, however, small amounts ranging from about 5 to 10 lbs of mercaptobenzothiazole per 1000 bbls. of heavy alkylate are used. The upper concentration limit is dictated only by the economics of the process. The preferred concentration of mercaptobenzothiazole for use in the distillation of heavy alkylates, which are particularly difficult to distill without odor development, ranges from about 10 to 50 lbs. per 1000 bbls. of heavy alkylate.

Accordingly, a primary object of this invention is to provide a process for preventing the formation of odor in essentially odorless naphthas, such as heavy alkylates and fractions thereof, during distillation. Another object of this invention is to provide a method of preventing the formation of odor and insuring odor stability in essentially odorless naphthas and heavy alkylate fractions by distilling them in the presence of a sufficient amount of mercaptobenzothiazole to insure an odor-free and stable product.

Another object of this invention is to provide a method of preventing the formation of odor during the distillation of essentially odor-free naphthas and alkylate fractions by distilling them in the presence of small amounts of mercaptobenzothiazole under reduced pressure, with or without the presence of an inert gas.

Mercaptobenzothiazole has the following formula:

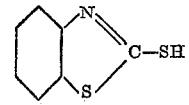

We have found that not all compounds known to be oxidation inhibitors will function as odor-prevention agents under the conditions of distillation normally applied to naphthas. It has previously been established that certain phenols and cresols, and even aniline, have oxidation-inhibiting properties at room temperature, but they are not effective to prevent odor at the distillation temperatures of this invention, and produce odorous products which cannot be rated as odorless naphthas. Mono-, di-, and tertiary aliphatic amines, typical of which is triamylamine, are well-known color inhibitors for various products, but they are not satisfactory for the purpose of producing odor-free and odor-stable naphthas or alkylates. Also, most special petroleum fractions or derivatives known to have oxidation-inhibiting properties are not satisfactory for the present purpose. Petroleum phenols and tar acids, for example, do not give products having passable odors when used with essentially odorless naphthas, heavy alkylates, and heavy alkylate fractions in accordance with this invention.

The odor-prevention agents used in the distillation must not break down at the naphtha distillation temperatures, must be free of odor themselves, and should not distill with the naphtha, with or without the use of steam or an inert gas during distillation. Accordingly, an imposing list of high-molecular-weight amines, normally considered to be oxidation inhibitors, is not suitable for the purposes of the present invention. This list inclues diphenylamine, quinoline, and many tertiary aliphatic and aryl amines, as for example triphenylamine. Mercaptobenzothiazole has been found to be unique for this reaction because it does not decompose during the distillation, it is effective either in the presence or absence of steam or an inert diluent, it has no odor, and it does not distill over into the product.

The distillation itself may be conducted at atmospheric or reduced pressures with small amounts of mercaptobenzothiazole. For example, the distillation may be conducted at pressures in the order of one to 300 mm. of mercury. Any known form of distillation apparatus may be used and it is not necessary to take any special precautions as to the materials of construction of the distillation apparatus.

The essentially odorless naphthas and heavy alkylates that can be benefited by the application of this invention have initial boiling points above about 340° to 350° F. The end boiling point of the naphtha or heavy alkylate is about 400° to 600° F., or even higher. Heavy naphthas coming within this boiling range are obtained from such sources as fractions from the silica gel refining or petroleum straight-run fractions, or heavy alkylates (or fractions thereof) obtained from alkylates. Alkylates can be produced by the acid alkylation of alkanes with olefins. An example of such a process is the hydrofluoric acid alkylation of isobutane with isobutylene. The "heavy alkylate" from such an alkylate product is the bottoms portion distilling above 340° to 350° F. resulting from the fractionation of the entire alkylate product. The following table gives the distillation characteristics of several heavy alkylates and naphthas which may be used in the present invention.

ing no mercaptobenzothiazole, was distilled under the same conditions. The distillate in this case was inferior in odor quality to the distillate obtained when mercaptobenzothiazole was present during the distillation and was unfit for commercial use.

EXAMPLE 2

A 100-cc. portion of heavy alkylate (bottoms with an initial boiling point of approximately 350° F. from the distillation of total alkylate manufactured by the hydrofluoric acid process), containing 50 lbs. of mercaptobenzothiazole per 1000 bbls., is steam distilled, keeping the bottoms temperature at or under 212° F. at all times. The 80% overhead product is an odorless naphtha (approximately 350° to 400° F. boiling range) of good odor quality. When the essentially odorless heavy alkylate is distilled under the same conditions, but without mercaptobenzothiazole present, the 80% distillate is a product of poor odor quality.

EXAMPLE 3

To 100 cc. of heavy alkylate (bottoms with an initial boiling point of approximately 350° F. from the distillation of total alkylate manufactured by the sulfuric acid process) was added 50 lbs./1000 bbls. of mercaptobenzothiazole and the mixture was distilled with steam, keeping the temperature of mixture under 212° F. during the distillation. The distillate, obtained in 80% yield, had a boiling range of approximately 350–400° F., and was practically odorles and therefore marketable as odorless mineral spirits.

A similar distillation carried out without mercaptobenzothiazole yielded a distillate of approximately 350–400° F. boiling range which had a slightly unpleasant odor. This distillate was not suitable from the odor standpoint for marketing as odorless mineral spirits.

EXAMPLE 4

A mixture of 100 cc. of heavy alkylate (bottoms with an initial boiling point of approximately 350° F. from the distillation of total alkylate manufactured by the sulfuric acid process) and 50 lbs./1000 bbls. of diphenylamine was distilled with steam, keeping the temperature of the mixture under 212° F. during the distillation. The

*Tests on Representative Odorless Naphthas and Heavy Alkylates*

DISTILLATION

| API Grav. | IBP | 5% | 10% | 20% | 30% | 40% | 50% | 60% | 70% | 80% | 90% | 95% | E.P. | Percent Rec. | Percent Res. | Percent Loss | Odor |
|---|---|---|---|---|---|---|---|---|---|---|---|---|---|---|---|---|---|
| 54.0 [1] | 347 | 354 | 356 | 358 | 360 | 363 | 366 | 369 | 374 | 383 | 414 | 466 | 517 | 98.0 | 1.6 | 0.4 | slight |
| 54.5 [2] | 352 | 358 | 360 | 360 | 361 | 362 | 362 | 363 | 364 | 366 | 370 | 377 | 393 | 98.8 | 1.2 | 0.0 | (essentially odorless). |
| 53.6 [2] | 360 | 367 | 368 | 369 | 369 | 370 | 371 | 372 | 373 | 376 | 380 | 328 | 413 | 98.6 | 1.2 | 0.2 | Do. |
| 51.4 [2] | 372 | 378 | 380 | 382 | 385 | 388 | 392 | 397 | 408 | 425 | 481 | 540 | 573 | 99.0 | 1.0 | 0.0 | Do. |
| 51.4 [2] | 361 | 366 | 368 | 371 | 373 | 376 | 381 | 386 | 396 | 416 | 468 | 509 | 543 | 98.1 | 1.4 | 0.5 | Do. |
| 55.4 [1] | 351 | 354 | 355 | 356 | 357 | 358 | 359 | 360 | 362 | 365 | 368 | 372 | 385 | 98.7 | 1.3 | 0.0 | Do. |
| 54.1 [1] | 355 | 359 | 360 | 363 | 364 | 367 | 369 | 373 | 379 | 388 | 418 | 468 | 512 | 98.4 | 1.1 | 0.5 | Do. |
| 55.2 [1] | 348 | 352 | 353 | 355 | 356 | 357 | 359 | 361 | 363 | 365 | 370 | 377 | 406 | 98.8 | 1.2 | 0.0 | Do. |

[1] Made from alkylate produced by the hydrofluoric acid process.
[2] Made from alkylate produced by the sulfuric acid process.

The invention is illustrated by the following examples:

EXAMPLE 1

A 40-cc. portion of heavy alkylate (bottoms with an initial boiling point of approximately 350° F. from the distillation of total alkylate manufactured by the sulfuric acid process), containing 150 lbs. of mercaptobenzothiazole per 1000 bbls., is distilled at an absolute pressure of approximately 2 mm. of Hg, taking the 80% overhead as odorless naphtha (boiling range approximately 350–400° F. under atmospheric pressure). This odorless naphtha is satisfactory for commercial use.

Another 40-cc. portion of the heavy alkylate, contain-distillate, obtained in 78% yield and having a boiling range of approximately 350–400° F., had a very slightly unpleasant odor and was not suitable for marketing as odorless mineral spirits.

EXAMPLE 5

A mixture of 100 cc. of heavy alkylate (bottoms with an initial boiling point of approximately 350° F. from the distillation of total alkylate manufactured by the sulfuric acid process) and 50 lbs./1000 bbls. of triphenylamine was distilled with steam, keeping the temperature of the mixture under 212° F. during the distillation. The distillate, obtained in 81% yield and having a boiling range of approximately 350–400° F., had a very slightly unpleasant odor and was not suitable for marketing as odorless mineral spirits.

As seen from the foregoing experiments, mercaptobenzothiazole is unique in its property of preventing the formation of odor during the distillation of essentially odorless naphthas and heavy alkylates. Since mercaptobenzothiazole has a boiling point of 355.1° F. it remains in the bottoms during the distillation to produce an odorless naphtha distillate. The odorless product can be inhibited against odor formation during storage by the addition of about 0.1 to 50 lbs. of mercaptobenzothiazole per 1000 bbls. of naphtha. The distillation may be carried out batchwise or continuously. In continuous operation, a mercaptobenzothiazole concentrate in the material being distilled, or in other liquid which does not contribute to the odor of the finished naphtha, is added continuously to the feed by means of a suitable device such as a proportioning pump. When mercaptobenzothiazole is added in this manner to a total alkylate during the distillation to prepare a heavy alkylate bottoms, it is usually not necessary to add additional mercaptobenzothiazole to the heavy alkylate bottoms during its distillation to produce further odorless fractions.

The amount of mercaptobenzothiazole used per amount of naphtha will be subject to considerable variation, depending upon the amount of odorous or odor-forming compounds present in the naphtha to be treated. At least a stoichiometric amount of mercaptobenzothiazole to react with or counteract the odorous compound in the naphtha should be used. An excess over the stoichiometric amount is recommended. More specifically, between about 0.01 to 5.0 lbs. of mercaptobenzothiazole per 100 bbls. of naphtha may be used.

The naphthas that can be treated in accordance with this invention include, (1) heavy alkylates or heavy alkylate fractions boiling from 300° F. to as high as 600° F. and which contain small amounts or traces of odorous materials arising during manufacturing or processing steps, or during storage; and (2) petroleum fractions boiling from about 300° F. to 600° F. which have been essentially denuded of their aromatic content by treatment with silica gel. The invention has particular application to naphthas boiling in the range of 300–525° F. and including heavy alkylate fractions prepared by the distillation of heavy alkylates at pressures under atmospheric and/or with steam. The heavy alkylates are obtained as bottoms from the distillation of alkylates, and may constitute 5–20% of the whole alkylates. Alkylates are produced by the alkylation of olefins with alkanes. An example of such material would be the product of alkylation of isobutylene with isobutane in the presence of hydrofluoric acid.

The distillation of the heavy alkylate containing the mercaptobenzothiazole may be carried out under vacuum, or with an inert gas such as steam, or with both vacuum and steam. If vacuum is used, the pressure at which the distillation is carried out may be 1–300 mm. Hg. When steam is used, it should be sufficient to give a practical rate of distillation when the temperature of the heavy alkylate is held at as low a temperature as possible. In some types of equipment the heavy alkylate temperature during distillation may be as high as 400° F.; usually it is maintained under 300° F. Still better results are obtained if the temperature is maintained at 250° F. or less. The steam used may equal half the weight of the heavy alkylate in some distillations, but is usually less than this value. Especially good results are obtained when the heavy alkylate and the mercaptobenzothiazole are subjected to distillation with both steam and vacuum; the mercaptobenzothiazole is of course left behind in the bottoms.

The mercaptobenzothiazole may be added to the total alkylate before its distillation to give heavy alkylate as bottoms, thus protecting both the whole alkylate and the heavy alkylate fraction against deterioration before the production of odorless mineral spirits therefrom. Mercaptobenzothiazole may also be used with deodorized petroleum distillates (deodorized by passage through a column of silica gel) boiling above 300–340° F., if it is desired to distill them after such deodorization. Ordinary petroleum naphthas with their usual intense odors are not deodorized by distillation in the presence of mercaptobenzothiazole. It should be understood that mercaptobenzothiazole does not deodorize a very odorous naphtha; it merely protects a material already essentially odorless from the formation of odor during distillation.

The embodiments of the invention in which an exclusive property or privilege is claimed are defined as follows:

1. The method of preparing stable, odor-free naphthas from essentially odorless hydrocarbon mixtures boiling in the range of above about 340° F. to about 600° F. which consists in distilling said hydrocarbon mixtures at superatmospheric pressures of about 1 to 300 mm. Hg in the presence of about 0.1 to 50 lbs. of mercaptobenzothiazole per 1000 bbls. of said hydrocarbon mixture and separating an odor-free hydrocarbon distillate.

2. The method in accordance with claim 1 in which said hydrocarbon mixture is a heavy alkylate fraction boiling in the range of about 347° to 577° F.

3. The method in accordance with claim 1 in which said odorless hydrocarbon mixture is a heavy naphtha which has been deodorized by treatment with silica gel.

4. The method in accordance with claim 1 in which said distillaiton is conducted in the presence of an inert vaporizable diluent.

5. The method in accordance with claim 4 in which said diluent is of the group consisting of steam and nitrogen.

6. The method in accordance with claim 1 in which said distillation is conducted by recovering two distillates, the first being a stable odorless fraction having an end boiling-point of about 400° F. and the second being a stable odorless fraction boiling above about 400° F.

7. The method of preparing stable, odor-free naphthas from essentially odorless hydrocarbon mixtures boiling in the range of above about 340° F. to about 600° F. which consists in distilling said hydrocarbon mixtures in the presence of an inert diluent and about 0.1 to 50 lbs. of mercaptobenzothiazole per 1000 bbls. of said hydrocarbon mixture and separating an odor-free hydrocarbon distillate therefrom.

8. The method in accordance with claim 7 in which said hydrocarbon mixture is a heavy alkylate fraction boiling in the range of about 347° to 577° F.

9. The method in accordance with claim 7 in which said distillation is conducted in the presence of an inert diluent under a vacuum of about one to 300 mm. Hg to recover two distillates, the first being a stable odorless fraction having an end boiling-point of about 400° F. and the second being a stable, odorless fraction boiling above about 400° F.

References Cited in the file of this patent

UNITED STATES PATENTS

| | | |
|---|---|---|
| 2,111,990 | Reid et al. | Mar. 22, 1938 |
| 2,154,097 | Loane | Apr. 11, 1939 |
| 2,201,258 | Busse | May 21, 1940 |
| 2,218,283 | Fuller | Oct. 15, 1940 |
| 2,384,002 | Bayes | Sept. 4, 1945 |

UNITED STATES PATENT OFFICE
CERTIFICATE OF CORRECTION

Patent No. 3,080,314　　　　　　　　　　　　　　　March 5, 1963

George W. Ayers

It is hereby certified that error appears in the above numbered patent requiring correction and that the said Letters Patent should read as corrected below.

Column 4, line 29, for "odorles" read -- odorless --; column 6, line 24, for "superatmospheric" read -- subatmospheric --; line 35, for "distillaton" read -- distillation --.

Signed and sealed this 1st day of October 1963.

(SEAL)
Attest:

ERNEST W. SWIDER　　　　　　　　　　　　　　DAVID L. LADD

Attesting Officer　　　　　　　　　　　　　　　Commissioner of Patents